(12) United States Patent
Jayaratne et al.

(10) Patent No.: US 10,184,016 B2
(45) Date of Patent: Jan. 22, 2019

(54) PROCESS FOR PRODUCING A ZIEGLER NATTA PROCATALYST FOR ETHYLENE POLYMERISATION

(71) Applicant: BOREALIS AG, Vienna (AT)

(72) Inventors: Kumudini Jayaratne, Helsinki (FI); Timo Leinonen, Tolkkinen (FI); Peter Denifl, Helsinki (FI)

(73) Assignee: Borealis AG (AT)

( * ) Notice: Subject to any disclaimer, the term of this patent is extended or adjusted under 35 U.S.C. 154(b) by 56 days.

(21) Appl. No.: 14/649,472

(22) PCT Filed: Dec. 20, 2013

(86) PCT No.: PCT/EP2013/077556
§ 371 (c)(1),
(2) Date: Jun. 3, 2015

(87) PCT Pub. No.: WO2014/096297
PCT Pub. Date: Jun. 26, 2014

(65) Prior Publication Data
US 2015/0322177 A1 Nov. 12, 2015

(30) Foreign Application Priority Data
Dec. 21, 2012 (EP) ..................................... 12198809

(51) Int. Cl.
- B01J 31/00 (2006.01)
- C08F 4/44 (2006.01)
- C08F 2/00 (2006.01)
- C08F 110/02 (2006.01)
- C08F 10/02 (2006.01)

(52) U.S. Cl.
CPC .................................... C08F 10/02 (2013.01)

(58) Field of Classification Search
CPC ... C08F 4/44; C08F 2/00; C08F 110/02; B01J 31/00
USPC .......................................... 526/352; 502/126
See application file for complete search history.

(56) References Cited

U.S. PATENT DOCUMENTS

| | | | | |
|---|---|---|---|---|
| 4,330,649 A * | 5/1982 | Kioka | .................... | C08F 4/022 526/124.9 |
| 4,647,635 A | 3/1987 | Hall | | |
| 5,055,535 A | 10/1991 | Spitz | | |
| 5,391,654 A | 2/1995 | Ahvenainen et al. | | |
| 6,552,138 B1 * | 4/2003 | Kimura | ................. | C08F 210/16 525/240 |
| 8,575,283 B1 * | 11/2013 | Fang | ......................... | C08F 4/16 526/125.3 |
| 2004/0235645 A1 * | 11/2004 | Morini | .................... | C07C 41/16 502/103 |
| 2004/0242406 A1 * | 12/2004 | Denifl | ................... | C08F 110/06 502/102 |
| 2004/0242407 A1 * | 12/2004 | Denifl | ................... | C08F 110/06 502/102 |
| 2005/0176900 A1 | 8/2005 | Zhu | | |
| 2013/0137568 A1 * | 5/2013 | Chang | ................... | C08F 110/06 502/104 |
| 2014/0058053 A1 | 2/2014 | Fang et al. | | |
| 2014/0378298 A1 | 12/2014 | Kipiani et al. | | |
| 2016/0060372 A1 * | 3/2016 | Saeed | ................... | C08F 210/16 526/189 |

FOREIGN PATENT DOCUMENTS

| | | | |
|---|---|---|---|
| CN | 1708518 A | 12/2005 | |
| CN | 101351479 A | 1/2009 | |
| CN | 102257019 A | 11/2011 | |
| CN | 102388070 A | 3/2012 | |
| CN | 104039841 A1 | 9/2014 | |
| EP | 0183538 A2 | 6/1986 | |
| EP | 0713886 A3 | 1/1997 | |
| EP | 0273208 B1 | 12/1997 | |
| EP | 3926165 B1 | 12/1998 | |
| EP | 0926165 A1 * | 6/1999 | ............. C07F 3/003 |
| EP | 0856013 B1 | 7/2000 | |
| EP | 0713886 B1 | 7/2001 | |
| EP | 1415999 A1 | 5/2004 | |
| EP | 1489110 A1 | 12/2004 | |
| EP | 1780255 A1 | 5/2007 | |
| EP | 1862480 A1 | 12/2007 | |
| EP | 1862481 A1 | 12/2007 | |
| EP | 2228395 A1 | 2/2009 | |
| EP | 2246368 A1 | 4/2009 | |
| EP | 2415790 A1 | 2/2012 | |
| EP | 2495266 A1 | 9/2012 | |
| EP | 2610273 A1 | 7/2013 | |
| WO | 92/12182 A1 | 7/1992 | |
| WO | 96/18662 A1 | 6/1996 | |
| WO | 9714723 A1 | 4/1997 | |
| WO | 0008073 A1 | 2/2000 | |
| WO | 0008074 A1 | 2/2000 | |
| WO | 00/26258 A1 | 5/2000 | |
| WO | 0058374 A1 | 10/2000 | |
| WO | 0155230 A1 | 8/2001 | |
| WO | 03000754 A1 | 1/2003 | |
| WO | 03000757 A1 | 1/2003 | |
| WO | 2004029112 A1 | 4/2004 | |
| WO | 2011087841 A1 | 7/2011 | |
| WO | 2011157742 A1 | 12/2011 | |
| WO | 2013098139 A1 | 7/2013 | |

OTHER PUBLICATIONS

Chinese Office Action dated Dec. 3, 2015.
(Continued)

Primary Examiner — William K Cheung
(74) Attorney, Agent, or Firm — Tarolli, Sundheim, Covell & Tummino LLP

(57) ABSTRACT

Process for the preparation of a particulate Group 2 metal/transition metal polymerization catalyst component for ethylene polymerization comprising a special bi-(oxygen containing ring) compound as internal donor, and to the use of such a catalyst component for preparing a catalyst used in the polymerization of ethylene.

15 Claims, No Drawings

(56) References Cited

OTHER PUBLICATIONS

Chinese Office Action dated Feb. 3, 2016.
U.S. Appl. No. 14/652,414 Office Action dated Sep. 22, 2016.
U.S. Appl. No. 14/652,414 Final Office Action dated Jan. 31, 2017.

* cited by examiner

PROCESS FOR PRODUCING A ZIEGLER NATTA PROCATALYST FOR ETHYLENE POLYMERISATION

This application is a § 371 National Stage Application of a PCT International Application No. PCT/EP2013/077556 filed Dec. 20, 2013 claiming priority to EP12198809.1 filed Dec. 21, 2012, which is incorporated by reference herein.

This invention relates to a process for producing a Ziegler Natta procatalyst comprising a particular electron donor for producing ethylene polymers with high molecular weight. The invention further concerns to said procatalysts and their use in producing ethylene polymers with said desired properties.

BACKGROUND OF THE INVENTION

Ziegler-Natta (ZN) type polyolefin catalysts are well known in the field of polymers, generally they comprise (a) at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or an internal donor compound. ZN catalyst may also comprise (b) further catalyst component(s), such as a cocatalyst and/or an external donor.

Various methods for preparing ZN catalysts are known in the state of art. In one known method, a supported ZN catalyst system is prepared by impregnating the catalyst components on a particulate support material. In WO-A-01 55 230, the catalyst component(s) are supported on a porous, inorganic or organic particulate carrier material, such as silica.

In a further well known method the carrier material is based on one of the catalyst components, e.g. on a magnesium compound, such as $MgCl_2$. This type of carrier material can also be formed in various ways. EP-A-713 886 of Japan Olefins describes the formation of $MgCl_2$ adduct with an alcohol which is then emulsified and finally the resultant mixture is quenched to cause the solidification of the droplets.

Alternatively, EP-A-856 013 of BP discloses the formation of a solid Mg-based carrier, wherein the Mg-component containing phase is dispersed to a continuous phase and the dispersed Mg-phase is solidified by adding the two-phase mixture to a liquid hydrocarbon.

The formed solid carrier particles are normally treated with a transition metal compound and optionally with other compounds for forming the active catalyst.

Accordingly, in case of external carriers, some examples of which are disclosed above, the morphology of the carrier is one of the defining factors for the morphology of the final catalyst.

One disadvantage encountered with the supported catalyst systems is that distribution of the catalytically active compounds on the support material is dependent on the surface chemistry and the surface structure of the support material. As a result this may often lead to non-uniform distribution of the active component(s) within the catalyst particle. As a consequence of the uneven distribution of the active sites in catalyst particles catalysts with intra-particle in-homogeneities, as well inter-particle in-homogeneities between separate particles are obtained, which leads finally to in-homogeneous polymer material.

Further, support material will remain in the final polymer as a residue, which might be harmful in some polymer applications.

WO-A-00 08073 and WO-A-00 08074 describe further methods for producing a solid ZN catalyst, wherein a solution of an Mg-based compound and one or more further catalyst compounds are formed and the reaction product thereof is precipitated out of the solution by heating the system. Furthermore, EP-A-926 165 discloses another precipitating method, wherein a mixture of $MgCl_2$ and Mg-alkoxide is precipitated together with a Ti-compound to give a ZN catalyst.

According to US 2005/0176900 a magnesium compound, an alcohol, an ether, a surfactant and an alkyl silicate are reacted first to get a catalyst support, which is then further reacted with a titanium compound. The solid titanium catalyst component is obtained via precipitation. The catalyst component further comprises an internal donor, which can be selected form a great variety of compounds.

WO 03/000757 as well WO 03/000754 describe a process for the preparation of an olefin polymerization catalyst component, enabling to prepare solid particles of a catalyst component comprising a group 2 metal together with a transition metal however without using any external carrier material or without using conventional precipitation methods, but using so called emulsification-solidification method for producing solid catalyst particles. In this process a phthalate type internal electron donor is prepared in situ during the catalyst preparation in a way and using chemicals so that an emulsion is formed. Droplets of the dispersed phase of the emulsion form the catalyst component, and solidifying the droplets results in solid particulate catalyst.

WO 2004/029112 discloses a further modification of the emulsion-solidification method as described in WO 03/000757 as well WO 03/000754, and relates thus to process for preparing an olefin polymerization catalyst component, wherein the process is further characterized in that a specific aluminum alkyl compound is brought into contact with the catalyst component, enabling a certain degree of activity increase at higher temperatures.

The above described ZN-catalysts are described to be useful in olefin polymerization, i.e. for producing propylene polymers.

In view of producing polyethylenes one problem that is often encountered with prior art ZN-catalysts is that it is difficult to produce an ethylene homo- or copolymer having high molecular weight. Polyethylenes of high molecular weight show i.a. an enhanced toughness. However, as the molecular weight of the polyethylene increases, the processability of the resin usually decreases.

Another problem encountered with prior art catalysts is that their activity is not very high.

Accordingly, although much development work has been done in the field of Ziegler-Natta catalysts for producing polymers, there remains a need for alternative or improved methods of producing ZN procatalysts with desirable properties for producing ethylene polymers with desired properties, since the properties of the ethylene (co-)polymers are i.a. determined by the catalyst used for their production.

Thus, it was an objective of the present invention to provide a process for preparing a procatalyst of a Ziegler-Natta catalyst composition which allows for the production of polyethylene having improved and more controlled properties. In particular it is desirable that the catalyst allows for a "tailoring" of the properties of the produced resins.

For tailoring the properties of the produced ethylene polymers it was already suggested to use ZN-catalysts comprising an internal donor, like THF (tetrahydrofuran).

For example WO 00/58374 discloses ZN catalysts comprising THF, whereby the primary purpose of the THF is to reduce the level of electrostatic charge in the polymerization medium so that agglomeration of polymer particles does not occur.

U.S. Pat. No. 5,055,535 discloses a method for controlling the MWD of polyethylene homopolymers and copolymers using a ZN catalyst comprising an electron donor selected from monoethers (e.g. tetrahydrofuran). The monoether, like tetrahydrofuran is added to the catalytic component and the cocatalyst, at the latest, upon commencement of the polymerization reaction and that under no circumstance should the monoethers be brought into contact with the catalytic component without the presence of the cocatalyst in the medium.

EP 1780225 A1 suggest the possibility of tailoring the properties of a multimodal ethylene polymer by using a modified ZN catalyst to influence the molecular weight distribution (MWD) of a higher molecular weight (HMW) component whilst essentially having no affect on the MWD of the lower molecular weight (LMW) component. The electron donor present in the ZN catalysts used is preferably tetrahydrofuran, whereby the ZN catalyst is preferably preformed and then contacted with an electron donor and optionally dried.

Nowadays HSE-(health, safety & environment) policies are an important factor in the production of catalysts and further polymers. In other words the polymers must fulfill the strict health and environmental requirements national and international institutions. One class of substances which have been considered as potential harmful compounds is phthalates, which have been commonly used as internal electron donors in Ziegler-Natta type catalysts. Also tetrahydrofuran has been recognized as a hazardous substance.

For these reasons it is still desirable to find alternative internal donors which do not include phthalates and/or tetrahydrofuran and which yields desired polymer properties, namely high molecular weight.

It would be furthermore highly advantageous if a process for preparing solid olefin polymerization catalyst components, i.e. the procatalyst, would be available which allows the formation of said solid catalyst components in different ways, like via precipitation or emulsion/solidification method, depending on the desired properties of the catalyst particles, i.e. desired morphology and/or particle size, whereby no gel-like material is formed during catalyst preparation and whereby the produced catalyst results in desired polymer properties, like melt flow rate, Mw, melting point, etc. The different ways (e.g. precipitation or emulsion/solidification method) thereby show a common mechanism.

Surprisingly these objects could be solved by the use of special bi-(oxygen containing ring) compounds as internal donor, which is added during the catalyst preparation.

Such bi-(oxygen containing ring) compounds have the formula (I)

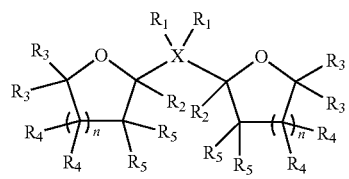

wherein in the formula (I)
X is C or Si,
$R_1$ can be the same or different and can be hydrogen, a linear or branched $C_1$ to $C_8$-alkyl group, or a $C_3$-$C_8$-alkylene group,
and $R_2$ to $R_5$ are the same or different and can be hydrogen, a linear or branched $C_1$ to $C_8$-alkyl, or a $C_3$-$C_8$-alkylene group,
whereby two or more of $R_1$ to $R_5$ can form a ring,
n is the same for both oxygen-containing rings and can be 0, 1 or 2,
whereby the two oxygen-containing rings can be individually saturated or unsaturated.

These compounds are known for example from EP 2495266 A1 or WO-2011157742 as randomizer/polar agent in the preparation of high styrene high vinyl solution-based styrene-butadiene rubber or from EP 183538 A1 as a reactive diluent in epoxy resins.

DESCRIPTION OF THE INVENTION

Accordingly the present invention provides a process for preparing an olefin polymerization catalyst component as defined in claim 1.

Thus the present invention provides a process for preparing an ethylene polymerization catalyst component in the form of solid particles comprising the steps of a) $a_1$) providing a solution of an alkoxy compound (Ax) being the reaction product of a compound of a Group 2 metal with a monohydric alcohol (A) in an organic liquid reaction medium; or $a_2$) providing a solution of an alkoxy compound (Ax) being the reaction product of a Group 2 metal compound and an alcohol mixture of a monohydric alcohol (A) and an alcohol (B) comprising in addition to the hydroxyl moiety at least one further oxygen bearing group being different to a hydroxyl moiety, optionally in an organic liquid reaction medium; or $a_3$) providing a solution of an alkoxy compound mixture of at least a first alkoxy compound (Ax) being the reaction product of a Group 2 metal compound and a monohydric alcohol (A), optionally in an organic liquid reaction medium and at least a second alkoxy compound (Bx) being the reaction product of a Group 2 metal compound and an alcohol (B) comprising in addition to the hydroxyl moiety at least one further oxygen bearing group being different to a hydroxyl moiety, optionally in an organic liquid reaction medium; and b) adding said solution to at least one compound of a transition metal (CT) and c) preparing the catalyst component in the form of solid particles, d) optionally performing one or more washing steps and e) recovering the catalyst component in the form of solid particles, wherein a compound of the formula (I)

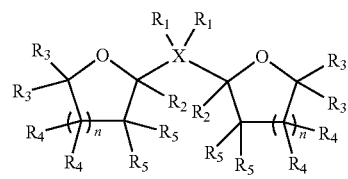

wherein in the formula (I)

X is C or Si, $R_1$ can be the same or different and can be hydrogen, a linear or branched $C_1$ to $C_8$-alkyl group, or a $C_3$-$C_8$-alkylene group, and $R_2$ to $R_5$ are the same or different and can be hydrogen, a linear or branched $C_1$ to $C_8$-alkyl, or a $C_3$-$C_8$-alkylene group, whereby two or more of $R_1$ to $R_5$ can form a ring, n is the same for both oxygen-containing rings and can be 0, 1 or 2, whereby the two oxygen-containing rings can be individually saturated or unsaturated, or an isomer mixture therefrom is added as internal donor at any step prior to step e).

Preferred embodiments are described in dependent claims as well in the following description. Further, the present invention provides the catalyst components obtainable in accordance with the present invention and further use of the catalyst components in the olefin polymerization.

The invention will be described in the following in greater detail, referring to the particular preferred embodiments. Essential in all embodiments is that the catalyst component in the form of solid particles can be prepared via liquid/liquid two-phase (emulsion) system—solidification method or via precipitation method leading to catalyst particles having desired physical properties, e.g. especially desired morphological properties and/or desired particle size and particle size distribution.

It has been surprisingly found by the inventors of the present invention that catalyst component particles having in embodiments desired morphology and/or particle size and/or particle size distribution can be obtained by the emulsion-solidification or precipitation way of preparing Ziegler-Natta (ZN) type catalysts using the special bi-(oxygen containing ring) compounds of formula (I) as internal donor during catalyst preparation, which are suitable for use in ethylene polymerization. According to the replica effect, the polymer particles produced by using the inventive catalyst have desired morphological properties, too.

The inventive catalyst preparation is based on a liquid/liquid two-phase system (emulsion/solidification method) or on a precipitation method where no separate external carrier materials such as silica or $MgCl_2$ are needed in order to get the catalyst component in the form of solid particles and the use of the special bi-(oxygen containing ring) compounds of formula (I) as internal donor during catalyst preparation.

This process for preparing the catalyst component in the form of solid particles is in particular characterized in that the formation of the catalyst component comprises use of at least one alkoxy compound (Ax) being the reaction product of at least one compound of Group 2 metal and at least a monohydric alcohol (A) and further characterized that bi-(oxygen containing ring) compounds of formula (I) as internal electron donor are used in the catalyst preparation as such.

According to one embodiment ($a_1$) this process is in particular characterized in that the formation of the catalyst component comprises use of an alkoxy compound (Ax) being a reaction product of a compound of Group 2 metal and a monohydric alcohol (A).

According to a second embodiment ($a_2$) this process is in particular characterized in that the formation of the catalyst component comprises use of an alkoxy compound (Ax) being a reaction product of at a compound of Group 2 metal and a mixture of monohydric alcohol (A) with a further alcohol (B) comprising in addition to the hydroxyl moiety at least one further oxygen bearing group being different to a hydroxyl moiety.

According to a third embodiment ($a_3$) an alkoxy compound mixture of the alkoxy compound (Ax) being a reaction product of at least one compound of Group 2 metal and a monohydric alcohol (A) and an additional alkoxy compound (Bx) being a reaction product of at least one compound of Group 2 metal and an alcohol comprising in addition to the hydroxyl moiety at least one further oxygen bearing group being different to a hydroxyl moiety, as defined below (alcohol B) is used.

Preferably the alkoxy compound is alkoxy compound (Ax) being a reaction product of a compound of Group 2 metal (embodiment ($a_1$)) and said alcohol (A) or said mixture of alcohol (A) and (B) (embodiment ($a_2$)).

The alkoxy compounds (Ax and Bx) can be prepared in situ in the first step of the catalyst component preparation process by reacting said compounds of Group 2 metal with the alcohol or alcohol mixture as described above, or said alkoxy compounds can be separately prepared reaction products, or they can be even commercially available as ready compounds and used as such in the catalyst preparation process of the invention.

During preparation of the alkoxy compounds (Ax or Bx) from the compound of Group 2 metal and the alcohol or alcohol mixture as defined above, the donor can be added into the reaction mixture, whereby a Group 2 metal complex (Complex Ac or Bc) is formed, which is defined in this application to be a complex of at least the Group 2 metal compound, the alcohol or alcohol mixture and a donor.

If the alkoxy compounds (Ax) and/or (Bx) are formed without using any donor(s), donor(s) as such is added separately to the reaction product solution or during preparation of the catalyst component at any step prior to step e).

Compounds of Group 2 metal are selected from the group comprising, preferably consisting of Group 2 metal dialkyls, alkyl Group 2 metal alkoxides and alkyl Group 2 metal halides. It can further be selected from the group consisting of dialkyloxy Group 2 metal, diaryloxy Group 2 metal, alkyl Group 2 metal alkoxides, alkyloxy Group 2 metal halides, aryloxy Group 2 metal halides, aryl Group 2 metal alkoxides and alkyl Group 2 metal aryloxides. Preferably Group 2 metal is magnesium.

Monohydric alcohols (A) are preferably those of formula ROH in which R is a linear or branched $C_1$-$C_{20}$ alkyl.

Typical $C_1$-$C_5$ monohydric alcohols are methanol, ethanol, n-propanol, iso-propanol, n-butanol, iso-butanol, sec.butanol, tert.butanol, n-amyl alcohol, iso-amyl alcohol, sec. amyl alcohol, tert. amyl alcohol, diethyl carbinol, sec. isoamyl alcohol, tert. butyl carbinol.

Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol.

Typical >$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1 octadecanol. The monohydric alcohols may be unsaturated, as long as they do not act as catalyst poisons.

Preferable monohydric alcohols are those of formula ROH in which R is a $C_2$-$C_{16}$ alkyl group, most preferably a $C_4$-$C_{12}$ alkyl group, particularly 2-ethyl-1-hexanol.

Alcohol (B) is an alcohol which comprises in addition to the hydroxyl moiety at least one further oxygen bearing group being different to a hydroxyl moiety Preferably such further oxygen bearing group is an ether moiety. The alcohol (B) as defined above may be aliphatic or aromatic although aliphatic compounds are more preferred. The aliphatic compounds may be linear, branched or cyclic or any combination thereof and in particular preferred alcohols are those comprising one ether moiety.

Illustrative examples of such preferred ether moiety containing alcohols (B) to be employed in accordance with the present invention are glycol monoethers, in particular $C_2$ to $C_4$ glycol monoethers, such as ethylene or propylene glycol monoethers wherein the ether moieties comprise from 2 to 18 carbon atoms, preferably from 2 to 12 carbon atoms. Preferred monoethers are $C_2$ to $C_4$ glycol monoethers and derivatives thereof. Illustrative and preferred examples are ethylene glycol butyl ether, ethylene glycol hexyl ether, ethylene glycol 2-ethylhexyl ether, propylene glycol n-butyl ether, propylene glycol methyl ether, propylene glycol ethyl ether, propylene glycol n-hexyl ether, propylene glycol 2-ethylhexyl ether, with ethylene glycol hexyl ether, 1,3-propylene glycol ethyl ether and 1,3-propylene glycol n-butyl ether, being particularly preferred.

The most preferred alcohol (B) is 1,3-propylene glycol n-butyl ether.

Usually the different alkoxy compounds or alcohols are employed in a mole ratio of from 10:1 to 1:10, preferably this mole ratio is from 8:1 to 1:8, more preferably 6:1 to 1:6, even more preferably 4:1 to 1:4 and in embodiments also 2:1 to 1:2. This ratio can be adjusted depending on the used donor.

The reaction for the preparation of the alkoxy compounds (Ax) and (Bx) may in embodiments, be carried out preferably in an aromatic or aromatic/aliphatic medium at a temperature of 20° to 80° C., and in case that the Group 2 metal is magnesium, the preparation of the alkoxy magnesium compound may be carried out at a temperature of 50° to 70° C.

The reaction medium used as solvent can be aromatic or a mixture of aromatic and aliphatic hydrocarbons, the latter one containing 5-20 carbon atoms, preferably 5-16 carbon atoms more preferably 5-12 carbon atoms and most preferably 5 to 9 carbon atoms. Preferably, the aromatic hydrocarbon is selected from substituted and unsubstituted benzenes, preferably from alkylated benzenes, even more preferably from toluene and xylenes, and is most preferably toluene.

The molar ratio of said reaction medium to magnesium is preferably less than 10, for instance from 4 to 10, preferably from 5 to 9.

Alkoxy compounds (Ax) and (Bx) are preferably alkoxy magnesium compounds.

The alkoxy magnesium compound group is preferably selected from the group consisting of magnesium dialkoxides.

The alkoxy magnesium compound group is the a reaction product of an alcohol (A) respectively alcohol (B) or a mixture of alcohol (A) and alcohol (B) with a magnesium compound selected from the group consisting of dialkyl magnesiums, alkyl magnesium alkoxides and alkyl magnesium halides. It can further be selected from the group consisting of dialkyloxy magnesium, diaryloxy magnesium, alkyloxy magnesium halides, aryloxy magnesium halides, alkyl magnesium alkoxides, aryl magnesium alkoxides and alkyl magnesium aryloxides.

The magnesium dialkoxide is preferably the reaction product of dialkyl magnesium of the formula $R_2Mg$, wherein each one of the two Rs is a similar or different $C_1$-$C_{20}$ alkyl, preferably a similar or different $C_2$-$C_{10}$ alkyl, and alcohol A respectively B.

Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an ethyl or octyl group, i.e. the dialkyl magnesium compound is butyl octyl magnesium or ethyl butyl magnesium.

Typical alkyl-alkoxy magnesium compounds RMgOR, when used, are ethyl magnesium butoxide, butyl magnesium pentoxide, octyl magnesium butoxide and octyl magnesium octoxide.

The electron donor compound used in the preparation of the catalyst of the present invention is selected from bi-(oxygen containing ring) compounds have the formula (I)

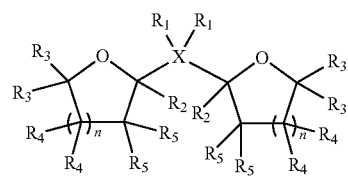

wherein in the formula (I)

X is C or Si, $R_1$ can be the same or different and can be hydrogen, a linear or branched $C_1$ to $C_8$-alkyl group, or a $C_3$-$C_8$-alkylene group, and $R_2$ to $R_5$ are the same or different and can be hydrogen, a linear or branched $C_1$ to $C_8$-alkyl, or a $C_3$-$C_8$-alkylene group, whereby two or more of $R_1$ to $R_5$ can form a ring, n is the same for both oxygen-containing rings and can be 0, 1 or 2, whereby the two oxygen-containing rings can be individually saturated or unsaturated.

Examples for linear or branched $C_1$ to $C_8$-alkyl groups are methyl, ethyl, n-propyl, i-propyl, n-butyl, sec.-butyl, tert.-butyl, pentyls, hexyl, and the like.

Examples for $C_3$-$C_8$-alkylene groups are pentylene, butylenes and the like.

In the formula (I) X is preferably C.

Two or more of $R_1$ to $R_5$ can also form a ring. If one or more rings are formed by the residues $R_1$ to $R_5$, these are preferably formed by $R_3$ and $R_4$ and/or $R_4$ and $R_5$.

Preferably the residues $R_1$ to $R_5$ do not form rings.

The two $R_1$ are preferably the same and can be a linear $C_1$ to $C_4$-alkyl, more preferably methyl or ethyl and most preferably both $R_1$ are methyl.

$R_2$ to $R_5$ are preferably the same or different and can be H or a $C_1$ to $C_2$-alkyl, more preferably only up to four of the residues $R_2$ to $R_5$ are a methyl, the others are H and most preferably $R_2$ to $R_5$ are all H.

For both oxygen-containing rings n is the same and is 0, 1 or 2, preferably 1 or 2 and more preferably 1.

Furthermore both oxygen-containing rings are preferably saturated or unsaturated, more preferably both oxygen-containing rings are saturated.

Examples for saturated oxygen-containing rings are:

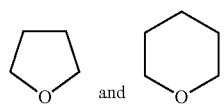

Examples for unsaturated oxygen-containing rings are:

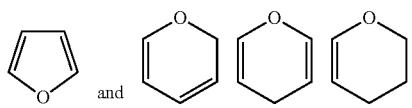

Examples of suitable internal donors are 2,2-di(2-tetrahydrofuryl)propane, 2,2-di(2-tetrahydropyranyl)propane, 2,2-di(2-(3,4-dihydro-2H-pyranyl))propane, 2,2-di-(2-pyranyl)propane, 2,2-di-(2-furan)-propane, as well as their analogous alkane compounds, like butane, hexane e.t.c.

The compound of a transition metal is preferably a compound of a Group 4 metal. The Group 4 metal is preferably titanium, and its compound to be reacted with the complex of a Group 2 is preferably a halide. Equivalent to titanium tetrahalide is the combination of an alkoxy titanium halide and a halogenation agent therefore, which are able to form a titanium tetrahalide in situ. The most preferred halide is the chloride.

In a still further embodiment of the invention, a compound of a transition metal can also be selected from Group 5 metals, Group 6 metals, Cu, Fe, Co, Ni and/or Pd compounds.

In principle said olefin polymerization catalyst components can be obtained in several ways all based on the same mechanism.

In one embodiment the preparation of the olefin polymerization catalyst component in form of solid particles comprises the steps of
(1) providing a solution (S1) of
  (1-1) an alkoxy compound (Ax) being the reaction product of a compound of a Group 2 metal with a monohydric alcohol (A), or
  (1-2) an alkoxy compound (Ax) being the reaction product of a Group 2 metal compound and an alcohol mixture of a monohydric alcohol (A) and an alcohol (B) comprising in addition to the hydroxyl moiety at least one further oxygen bearing group being different to a hydroxyl moiety, or
  (1-3) an alkoxy compound mixture of at least a first alkoxy compound (Ax) being the reaction product of a Group 2 metal compound and a monohydric alcohol (A), and at least a second alkoxy compound (Bx) being the reaction product of a Group 2 metal compound and an alcohol (B) comprising in addition to the hydroxyl moiety at least one further oxygen bearing group being different to a hydroxyl moiety,
(2) combining said solution (S1) with at least one transition metal compound (CT),
(3) precipitating said catalyst component in the form of a solid particle,
(4) optionally performing one or more washing steps and
(5) recovering the solidified particles of the olefin polymerization catalyst component,
wherein an electron donor of formula (I) or an isomer mixture therefrom is added at any step prior to step (5).

In step (1) it is possible to use an alkoxy compound (Ax) being a reaction product of a Group 2 metal compound and a monohydric alcohol (A), as defined above (1-1).

It is further possible to use an alkoxy compound (Ax) being a reaction product of a Group 2 metal compound and a mixture of alcohol (A) with alcohol (B) comprising in addition to the hydroxyl moiety at least one further oxygen bearing group being different to a hydroxyl moiety, as defined above (1-2).

The third possibility is to use a mixture of an alkoxy compound (Ax) being a reaction product of a Group 2 metal compound and a monohydric alcohol (A) and an alkoxy compound (Bx) being a reaction product of a Group 2 metal compound and an alcohol (B) comprising in addition to the hydroxyl moiety at least one further oxygen bearing group being different to a hydroxyl moiety, as defined above (1-3).

Preferably the alkoxy compound used is alkoxy compound (Ax) being a reaction product of a Group 2 metal compound and a monohydric alcohol (A) or is alkoxy compound (Ax) being a reaction product of a Group 2 metal compound and a mixture of alcohol (A) with alcohol (B) comprising in addition to the hydroxyl moiety at least one further oxygen bearing group being different to a hydroxyl moiety, as defined above.

Most preferably the alkoxy compound used is alkoxy compound (Ax) being a reaction product of a Group 2 metal compound and a mixture of alcohol (A) with alcohol (B) comprising in addition to the hydroxyl moiety at least one further oxygen bearing group being different to a hydroxyl moiety.

It is possible to dissolve the transition metal compound in step (2) in an organic liquid reaction medium (OM2), whereby solution (S2) is formed.

The process of solids precipitation can be carried out by several methods:

In one embodiment the addition of solution (S1) to the at least one transition metal compound (CT) in step (2) is done at a temperature of at least 50° C., preferably in the temperature range of 50 to 110° C., more preferably in the range of 70 to 100° C., most preferably in the range of 85 to 95° C., at which temperature the at least one transition metal compound (CT) is in a liquid form, resulting in the precipitation of said catalyst components in form of solid particles.

In this case it is especially appreciated that after having combined the solution (S1) with at least one transition metal compound (CT) the whole reaction mixture is kept at least at 50° C., more preferably is kept in the temperature range of 50 to 110° C., more preferably in the range of 70 to 100° C., most preferably in the range of 85 to 95° C., to secure full precipitation of the catalyst component in form of a solid particles.

In this case it is possible that a surfactant is added in step (1) or step (2).

General examples of surfactants include polymer surfactants, such as poly(alkyl methacrylate) and poly(alkyl acrylate), and the like. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

Examples of surfactants that are commercially available include those under the trademarks VISCOPLEX® available from EvonikRohMax Additives, GmbH, especially those having product designations 1-254, 1-256 and those under the trade designations CARBOPOL® and PEMULEN® available from Noveon/Lubrizol.

In a second embodiment the solution (S1) is mixed with at least one transition metal compound (CT) in liquid form at a temperature of about −20° C. to about 30° C. and precipitating the catalyst components in form of a solid particles by subsequently slowly raising the temperature to at least 50° C., preferably in the temperature range of 50 to 110° C., more preferably in the range of 70 to 100° C., most preferably in the range of 85 to 95° C., whereby the rate of temperature increase is in the range from 0.1° C. to 30° C. per minute, preferably 0.5 to 10° C. per minute.

In this case it is especially appreciated that a surfactant is added to the solution (S1) before step (2). Suitable surfactants are described above.

In both cases it is possible, but not necessary, to add some precipitating agent into the system. Such precipitating agents are able to effect morphology of the particles formed during the precipitation step. In a specific process no precipitating agent has been used. A precipitating agent according to this invention is an agent which promotes the precipitation of the catalyst component in form of a solid particle. The organic liquid medium used as (OM2), as defined later in this application, can promote the precipitating and thus act and used as a precipitating agent. However, the final catalyst does not contain any such medium.

Moreover it is preferred that no precipitating agent has been used in the process as stated above.

Suitable alkoxy compounds (Ax) and (Bx) and their preparation have been described above.

Suitable electron donors as well as suitable transition metal compounds are also described above.

Preferably $TiCl_4$ is used as transition metal compound.

The electron donor is preferably added to the alkoxy compound (Ax), or alkoxy compound (Bx) if present, or to the mixture of the alkoxy compounds (Ax) and (Bx), obtained by mixing alkoxy compound (Ax) being a reaction product of a Group 2 metal compound as described above with the monohydric alcohol (A) as described above and alkoxy compound (Bx) being a reaction product of a Group 2 metal compound as described above and the alcohol (B), as described above, whereby the reaction medium used as solvent for the Group 2 metal compound can be aromatic or a mixture of aromatic and aliphatic hydrocarbons, the latter one containing 5-20 carbon atoms, preferably 5-16 carbon atoms more preferably 5-12 carbon atoms and most preferably 5 to 9 carbon atoms. Preferably, the aromatic hydrocarbon is selected from substituted and unsubstituted benzenes, preferably from alkylated benzenes, even more preferably from toluene and xylenes, and is most preferably toluene.

In further embodiments the internal donor can be added also at step (2), (3) or (4), but in any case before step (5)

It is also possible to use isomer mixtures of the above described bi-(oxygen-containing ring) compounds of formula (I).

The reaction medium corresponds to the organic liquid reaction medium (OM1) of step (1).

The organic liquid reaction medium (OM2), where $TiCl_4$ can be solved, can be the same as the organic liquid reaction medium (OM1) or can be different thereto, the latter being preferred.

Preferably the organic liquid reaction medium (OM2) is $C_5$ to $C_{10}$ hydrocarbon, more preferably of a $C_6$ to $C_{10}$ alkane, like heptane, octane or nonane, or any mixtures thereof.

It is in particular appreciated that the organic liquid reaction medium (OM1) is a $C_6$ to $C_{10}$ aromatic hydrocarbon, most preferably toluene, and the organic liquid reaction medium (OM2) is a $C_6$ to $C_{10}$ alkane, most preferably heptane.

Further it is appreciated that the organic liquid reaction media (OM1) and (OM2) are selected in a way which supports the immediate precipitation of the solid catalyst particle.

When adding the solution (S1) to the at least one transition metal compound (CT) mixing is appreciated. Suitable mixing techniques include the use of mechanical as well as the use of ultrasound for mixing, as known to the skilled person.

After precipitation the catalyst in solid form is washed in a known manner.

Accordingly it is preferred that the catalyst in solid form is washed at least once up to 6 times, preferably at least twice, most preferably at least three times with a hydrocarbon, which preferably is selected from aromatic and aliphatic hydrocarbons, preferably with toluene, heptane or pentane. The first wash is preferably done with an aromatic hydrocarbon, more preferably with toluene, particularly with hot (e.g. 80 to 100° C.) toluene, which might include a smaller or higher amount of $TiCl_4$ in it. The amount of $TiCl_4$ can vary from a few vol % to more than 50-vol %, such as from 5-vol % to 50-vol %, preferably from 5 to 15-vol %. It is also possible that at least one wash is done with 100-vol % $TiCl_4$.

One or several further washes after aromatic and/or $TiCl_4$ washes can be run with aliphatic hydrocarbons of 4 to 8 carbon atoms. Preferable these latter washings are performed with heptane and/or pentane. Washings can be done with hot (e.g. 90° C.) or cold (room temperature) hydrocarbons or combinations thereof. It is also possible that all washings will be done with the same solvent, e.g. toluene.

In addition, during the catalyst component preparation a reducing agent, which decreases the amount of titanium present in said solidified particles of the olefin polymerization catalyst component being present in the oxidation state +4, can be added.

Suitable reducing agents are aluminium alkyl compounds, aluminium alkyl alkoxy compounds as well as magnesium compounds as defined in the present specification.

Suitable aluminium compounds have a general formula $AlR_{3-n}X_n$, wherein R stands for a straight chain or branched alkyl or alkoxy group having 1 to 20, preferably 1 to 10 and more preferably 1 to 6 carbon atoms, X independently represents a residue selected from the group of halogen, preferably chloride, and n stands for 0, 1 or 2. At least one of the R residues has to be an alkyl group.

The compound can be added as an optional compound to the catalyst component synthesis and can be added at any step (2) to (3), or during the washing step as described above, however, before step (5).

Preferably the reducing compound is added during the washing step, more preferably during the first washing step with hot toluene.

Illustrative examples of aluminium alkyl and alkoxy compounds to be employed in accordance with the present invention are:

Tri-($C_1$-$C_6$)-alkyl aluminium compounds and chlorinated aluminium ($C_1$-$C_6$)-alkyl compounds, especially diethyl aluminium chloride;

diethyl aluminium ethoxide, ethyl aluminium diethoxide, diethyl aluminium methoxide, diethyl aluminium propoxide, diethyl aluminium butoxide, dimethyl aluminium ethoxide, of which in particular diethyl aluminium ethoxide is preferred.

Suitable magnesium compounds are magnesium compounds as defined herein in connection with the compound of a Group 2 metal. The respective disclosure is incorporated herein by reference with respect to the magnesium compound to be added in accordance with the process of the present invention. In particular, suitable magnesium compounds are dialkyl magnesium compounds or halogenated alkyl magnesium compounds of the general formula $MgR_{2-n}X_n$, where each n is 0 or 1, and each R are same or different alkyl groups with 1 to 8 carbon atoms and X is halogen, preferably Cl. Preferred magnesium compounds are $MgR_2$, where each R can be the same or different and are alkyl groups of 2-8 C-atoms, like butyloctyl magnesium, In many cases it is preferred to use Mg alkyl compounds of alkyl groups with 2-4 C atoms, like buthylethylmagnesium.

The added amount of the optional Al compound depends on the desired degree of reduction of amount of titanium present in the solidified particles of the olefin polymerization catalyst component being present in the oxidation state +4. The preferred amounts of Al in the catalyst component depend to some extent on the Al compound, e.g. if an Al alkoxy compound is used, the preferred final Al amounts seem to be lower than if e.g. Al alkyl chloride compounds are used.

The final catalyst component particles have an Al content of 0.0 to 5.0 wt %, preferably 0.0 to 4.0 wt % or 0.0 to 3.5 wt %.

The magnesium compound to be added in accordance with the present invention is added in corresponding amounts.

Preferably a chlorinated aluminium alkyl compounds, especially diethyl aluminium chloride; is added.

In the second way the preparation of the catalyst component in form of solid particles comprises the steps of (1) providing a solution (S1) of
  (1-1) an alkoxy compound (Ax) being the reaction product of a compound of a Group 2 metal with a monohydric alcohol (A), or
  (1-2) an alkoxy compound (Ax) being the reaction product of a Group 2 metal compound and an alcohol mixture of a monohydric alcohol (A) and an alcohol (B) comprising in addition to the hydroxyl moiety at least one further oxygen bearing group being different to a hydroxyl moiety, or
  (1-3) an alkoxy compound mixture of at least a first alkoxy compound (Ax) being the reaction product of a Group 2 metal compound and a monohydric alcohol (A) and at least a second alkoxy compound (Bx) being the reaction product of a Group 2 metal compound and an alcohol (B) comprising in addition to the hydroxyl moiety at least one further oxygen bearing group being different to a hydroxyl moiety,
(2) adding said solution (S1) to at least one compound of a transition metal (CT) to produce an emulsion, wherein the dispersed phase of which is in the form of droplets and contains more than 50 mol % of the Group 2 metal in said alkoxy compound(s),
(3) agitating the emulsion in order to maintain the droplets of said dispersed phase within said predetermined average size range of 5 to 200 μm,
(4) solidifying said droplets of the dispersed phase,
(5) optionally performing one or more washing steps and
(6) recovering the solidified particles of the olefin polymerization catalyst component, whereby an electron donor of formula (I) or an isomer mixture therefrom, is added at any step prior to step (6).

In step (1) it is possible to use an alkoxy compound (Ax) being a reaction product of a Group 2 metal compound and a monohydric alcohol (A), as defined above.

It is further possible to use an alkoxy compound (Ax) being a reaction product of a Group 2 metal compound and a mixture of alcohol (A) with alcohol (B) comprising in addition to the hydroxyl moiety at least one further oxygen bearing group being different to a hydroxyl moiety, as defined above.

The third possibility is to use a mixture of an alkoxy compound (Ax) being a reaction product of a Group 2 metal compound and a monohydric alcohol (A) and an alkoxy compound (Bx) being a reaction product of at least one Group 2 metal compound and an alcohol (B) comprising in addition to the hydroxyl moiety at least one further oxygen bearing group being different to a hydroxyl moiety, as defined above.

Suitable alkoxy compounds (Ax) and (Bx) and their preparation have been described above.

Suitable electron donors as well as suitable transition metal compounds are also described above.

In step (1) the solution (S1) is typically a solution of at least one alkoxy compound (Ax) and optionally an alkoxy compound (Bx) in liquid hydrocarbon reaction medium, which can be provided in situ by reacting an alcohol (A) or a mixture of alcohol (A) and alcohol (B) with the Group 2 metal compound in a liquid hydrocarbon medium to form alkoxy compound (Ax), as described above, and optionally mixing alkoxy compound (Ax) with alkoxy compound (Bx), prepared by reacting an alcohol (B) with the Group 2 metal compound in a liquid hydrocarbon medium.

The internal donor as defined above is preferably added in step (1) to said solution (S1).

The electron donor is added to alkoxy compound (Ax), or alkoxy compound (Bx) if present, or to the mixture of the alkoxy compound (Ax) and (Bx).

Isomer mixtures of the above described donors can also be used.

The solution (S1) of step (1) is then typically added to the at least one compound of a transition metal, such as titanium tetrachloride. This addition preferably is carried out at a low temperature, such as from −10 to 40° C., preferably from −5 to 30° C., such as about 0° C. to 25° C.

During any of these steps an organic reaction medium or solvent may be present, typically selected among aromatic and/or aliphatic hydrocarbons as described above.

The process in accordance with the present invention yields as intermediate stage, as identified above an emulsion of a denser, transition metal compound/toluene-insoluble, oil dispersed phase typically having a transition metal/Group 2 mol ratio of 0.1 to 10 in an oil disperse phase having a transition metal/Group 2 mol ratio of 10 to 100.

Transition metal compound is preferably Group 4 metal compound, and is most preferably $TiCl_4$. Group 2 metal is preferably Mg. This emulsion is then typically agitated, optionally in the presence of an emulsion stabilizer and/or a turbulence minimizing agent, in order to maintain the droplets of said dispersed phase, typically within an average size range of 5 to 200 μm. The catalyst particles are obtained after solidifying said particles of the dispersed phase e.g. by heating.

The said disperse and dispersed phases are thus distinguishable from one another by the fact that the denser oil, if contacted with a solution of Group 4 metal compound preferably $TiCl_4$ in toluene, will not dissolve in it. A suitable solution for establishing this criterion would be one having a toluene mol ratio of 0.1 to 0.3. They are also distinguishable by the fact that the great preponderance of the Mg provided (as complex) for the reaction with the Group 4 metal compound is present in the dispersed phase, as revealed by comparison of the respective Group 4 metal/Mg mol ratios.

In effect, therefore, virtually the entirety of the reaction product of the Mg complex with the Group 4 metal—which is the precursor of the ultimate catalyst component—becomes the dispersed phase, and proceeds through the further processing steps to the final particulate form. The disperse phase, still containing a useful quantity of Group 4 metal, can be reprocessed for recovery of that metal.

The production of a two-phase reaction product is encouraged by carrying out the Mg complex/Group 4 metal compound reaction at low temperature, specifically above −10° C. but below 50° C., preferably between above −5° C. and below 40° C. Since the two phases will naturally tend to separate into a lower, denser phase and supernatant lighter phase, it is necessary to maintain the reaction product as an emulsion by agitation, preferably in the presence of an emulsion stabilizer.

The emulsion, i.e. the two phase liquid-liquid system may be formed in all embodiments of the present invention by simple stirring and optionally adding (further) solvent(s) and additives, such as the turbulence minimizing agent (TMA) and/or the emulsifying agents described further below.

Emulsifying agents/emulsion stabilizers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$ (meth)acrylates such as poly(hexadecyl)-methacrylate and poly(octadecyl)-methacrylate. Suitable examples of commercially available surfactants are e.g. those sold under the name of Viscoplex®, like Viscoplex®, 1-124 and 1-126, as indicated earlier in this application.

As mentioned above a turbulence minimizing agent (TMA) can be added to the reaction mixture in order to improve the emulsion formation and maintain the emulsion structure. Said TMA agent has to be inert and soluble in the reaction mixture under the reaction conditions, which means that polymers without polar groups are preferred, like polymers having linear or branched aliphatic carbon backbone chains.

Said TMA is in particular preferably selected from alpha-olefin polymers of alpha-olefin monomers with 6 to 20 carbon atoms, like polyoctene, polynonene, polydecene, polyundecene or polydodecene or mixtures thereof. Most preferable it is polydecene or mixture thereof with other monomers as listed above.

TMA can be added to the emulsion in an amount of e.g. 1 to 1.000 ppm, preferably 5 to 100 ppm and more preferable 5 to 50 ppm, based on the total weight of the reaction mixture.

It has been found that the best results are obtained when the Group 4 metal/Mg mol ratio of the denser oil is 1 to 5, preferably 2 to 4, and that of the disperse phase oil is 55 to 65.

Generally the ratio of the mol ratio Group 4 metal/Mg in the disperse phase oil to that in the denser oil is at least 10.

Solidification of the dispersed phase droplets by heating is suitably carried out at a temperature of 70 to 150° C., usually at 80 to 110° C., preferably at 85 to 110° C.

For isolating the solidified particles the reaction mixture is allowed to settle and the solidified particles are recovered from this reaction mixture for example by syphoning or by an in-stream filtering unit.

The catalyst component in form of solid particles may be washed at least once up to 6 times, preferably at least twice, most preferably at least three times with a hydrocarbon, which preferably is selected from aromatic and aliphatic hydrocarbons, preferably with toluene, heptane or pentane, Preferably the first wash is done with an aromatic hydrocarbon, more preferably with toluene, particularly with hot (e.g. 80 to 100° C.) toluene, which might include a smaller or higher amount of $TiCl_4$ in it. The amount of $TiCl_4$ can vary from a few vol % to more than 50-vol %, such as from 5-vol % to 50-vol %, preferably from 5 to 15-vol %. It is also possible that at least one wash is done with 100-vol % $TiCl_4$.

One or several further washes after aromatic and/or $TiCl_4$ washes can be run with aliphatic hydrocarbons of 4 to 8 carbon atoms. Preferable these latter washings are performed with heptane and/or pentane. Washings can be done with hot (e.g. 90° C.) or cold (room temperature) hydrocarbons or combinations thereof. It is also possible that all washings will be done with the same solvent, e.g. toluene.

The washing can be optimized to give a catalyst component with novel and desirable properties.

Finally, the washed catalyst component is recovered.

It can further be dried, as by evaporation or flushing with nitrogen or it can be slurred to an oily liquid with or without any drying step.

In addition, during the catalyst component preparation a reducing agent, which decreases the amount of titanium present in said solidified particles of the olefin polymerization catalyst component being present in the oxidation state +4, can be added.

Suitable reducing agents are aluminium alkyl compounds, aluminium alkyl alkoxy compounds as well as magnesium compounds as defined in the present specification.

Suitable aluminium compounds have a general formula $AlR_{3-n}X_n$, wherein R stands for a straight chain or branched alkyl or alkoxy group having 1 to 20, preferably 1 to 10 and more preferably 1 to 6 carbon atoms, X independently represents a residue selected from the group of halogen, preferably chloride, and n stands for 0, 1 or 2. At least one of the R residues has to be an alkyl group.

The compound can be added as an optional compound to the catalyst component synthesis and brought into contact with the droplets of the dispersed phase of the agitated emulsion before recovering the solidified particles in step (5). I.e. the Al compound can be added at any step (2) to (4), or during the washing step as described above, however, before step (6). Reference is made to WO 2004/029112, EP-A-1 862 480 and to EP-A-1 862 481.

Illustrative examples of aluminium alkyl and alkoxy compounds to be employed in accordance with the present invention are:

Tri-($C_1$-$C_6$)-alkyl aluminium compounds and chlorinated aluminium ($C_1$-$C_6$)-alkyl compounds, especially diethyl aluminium chloride;

diethyl aluminium ethoxide, ethyl aluminium diethoxide, diethyl aluminium methoxide, diethyl aluminium propoxide, diethyl aluminium butoxide, dimethyl aluminium ethoxide, of which in particular diethyl aluminium ethoxide is preferred.

Suitable magnesium compounds are magnesium compounds as defined herein in connection with the compound of a Group 2 metal. The respective disclosure is incorporated herein by reference with respect to the magnesium compound to be added in accordance with the process of the present invention. In particular, suitable magnesium compounds are dialkyl magnesium compounds or halogenated alkyl magnesium compounds of the general formula $MgR_{2-n}X_n$, where each n is 0 or 1, and each R are same or different alkyl groups with 1 to 8 carbon atoms and X is halogen, preferably Cl. Preferred magnesium compounds are $MgR_2$, where each R can be the same or different and are alkyl groups of 2-8 C-atoms, like butyloctyl magnesium, In many cases it is preferred to use Mg alkyl compounds of alkyl groups with 2-4 C atoms, like buthylethylmagnesium.

The added amount of the optional Al compound depends on the desired degree of reduction of amount of titanium present in the solidified particles of the olefin polymerization catalyst component being present in the oxidation state +4. The preferred amounts of Al in the catalyst component depend to some extent on the Al compound, e.g. if an Al alkoxy compound is used, the preferred final Al amounts seem to be lower than if e.g. Al alkyl chloride compounds are used.

The final catalyst component particles have an Al content of 0.0 to 5.0 wt %, preferably 0.0 to 4.0 wt % or 0.0 to 3.5 wt %.

The magnesium compound to be added in accordance with the present invention is added in corresponding amounts.

The aluminium alkyl or alkoxy compound and the magnesium compound can be used alone or in combination.

Preferably an Al alkyl or Al alkyl alkoxy compound, as defined above, is added.

The optional Al or Mg compound or a mixture thereof is preferably added before step (5), more preferably during the washing step, which comprises at least one, preferably two and more preferably three washing procedures with the same or preferably different hydrocarbons as washing medium.

The aluminium alkyl or alkoxy compound and/or magnesium compound to be used in the catalyst component preparation of the invention can be added to any of the washing mediums, which are, as described above, preferably toluene, heptane and/or pentane.

Though the procatalyst preparation according to the inventive method can be carried out batch-wise, it is also preferable and possible to prepare the catalyst component semi-continuously or continuously. In such semi-continuous or continuous process, the solution of the complex of the group 2 metal and said electron donor, which is prepared by reacting the compound of said metal with said electron donor in an organic liquid reaction medium, is mixed with at least one compound of a transition metal, which might be solved in the same or different organic liquid reaction medium. The so obtained solution is then agitated, possibly in the presence of an emulsion stabilizer, and then the so-agitated emulsion is fed into a temperature gradient reactor, in which the emulsion is subjected a temperature gradient, thus leading to solidifying the droplets of a dispersed phase of the emulsion. The optional TMA is added to the reaction mixture before solidifying the catalyst droplets, i.e. it can be included already into the alkoxy compound or mixture of the alkoxy compounds or added during addition of other components and/or forming the emulsion.

When feeding said agitated emulsion to the temperature gradient reactor, an inert solvent, in which the droplets are not soluble, can additionally be fed into that gradient reactor in order to improve the droplet formation and thus leading to a uniform grain size of the particles of the catalyst component, which are formed in the temperature gradient reactor when passing through said line. Such additional solvent might be the same as the organic liquid reaction medium, which is used for preparing the solution of the complex of the group 2 metal as explained above in more detail.

The solidified particles of the olefin polymerization catalyst component can subsequently be recovered by an in-stream filtering unit and then, optionally after some additional washing and drying steps in order to remove unreacted starting components, can be stored for further use. In one embodiment the catalyst can be fed after washing steps into the olefin polymerization reactor, so that a continuous preparation and feed to the reactor is guaranteed. It is also possible to mix the solidified and washed catalyst component with an oily fluidic liquid and store and use the catalyst component as catalyst component-oil slurry. In this way the drying steps can be avoided, which might be sometimes detrimental to the catalyst components morphology. This oil-slurry method is described in general in EP-A-1489110 of the applicant, incorporated herein by reference.

As it can be seen from the above description of the semi-continuous or continuous process, it is thus possible to use separated reaction vessels for the different process steps and to transfer the reaction products which are prepared in the respective reaction vessels and to feed them in-line into further reaction vessels for formation of the emulsion and, subsequently, of the solidified particles.

It is preferred to use a full-continuous process as the time saving in said process is remarkable. In such fully continuous process, the formation of the solidified particles could be carried out in the temperature gradient line in the kind of pipe reactor, which is sufficiently long and which is subjected said temperature gradient from the starting temperature in the lower range of 20 to 80° C. up to a "solidifying" temperature of 70 to 150° C. The temperature gradient is preferably obtained by means of heating the pipe reactor from the outside by applying normal heaters, microwaves, etc.

As mentioned before, a filtering unit might preferably be used for filtering the solidified particles from the solvent stream. For said filtering unit, various drums and sieving systems can be used, depending on the specific particle sizes.

With both production ways, the finally obtained solid catalyst component is desirably in the form of particles having generally an average size range, determined by using a Coulter Counter LS200 at room temperature (20° C.) with n-heptane as medium, of 5 to 200 µm, preferably 5 to 100 µm and more preferably 5 to 60 µm, even an average size range of 10 to 25 µm is possible.

The particle size distribution, measured by Coulter method and defined as SPAN of the catalysts of the invention depends on the way of preparation. With the emulsion/solidification method the particle size distribution is usually lower than with the precipitation method.

Nevertheless it is desired that the particle size distribution of the solid catalyst components prepared according to the precipitation method is as low as possible and even more preferred similar to that of solid catalyst components prepared according to the emulsion/solidification method.

Preferably the particle size distribution, which is defined as SPAN, is in the range of 0.5 to at most 4.0, more preferable from 0.5 to at most 3.0 and even more preferably 0.5 to at most 2.0.

SPAN is defined as $$\frac{d90\ [\mu m] - d10\ [\mu m]}{d50\ [\mu m]}$$

where d90 indicates the particle diameter at 90% cumulative size, d10 indicates the particle diameter at 10% cumulative size, and d50 indicates the particle diameter at 50% cumulative size.

The procatalysts prepared according to the method of the present invention have desired morphology and particle size as well as particle size distribution and are suitable for producing ethylene polymers with the desired polymer properties.

It has been surprisingly found by the inventors of the present invention that catalyst component particles having desired morphology and particle size as well as particle size distribution can be obtained by a common mechanism either via the precipitation or via the emulsion/solidification way of preparing Ziegler-Natta (ZN) type catalysts, and are suitable for use in ethylene polymerization, optionally with co-monomers selected from $C_3$-$C_{20}$ monomers, preferably $C_4$-$C_{10}$ monomers.

Thus it is a further object of the present invention to provide catalyst components in form of solid particles e.g. by a process as describe above and to the use thereof for the preparation of a catalyst system being suitable in ethylene polymerization processes.

The catalyst components according to the invention have good morphology, good particle size distribution and result in polymerization catalysts having highly suitable polymerization activities. According to the replica effect, the polymer particles produced by using the inventive catalyst components have good morphological properties, too.

The inventive catalyst component preparation is based on a liquid/liquid two-phase system (emulsion/solidification method) or on the precipitation method where in both cases no separate external carrier materials such as silica or $MgCl_2$ are needed in order to get solid catalyst particles.

For the production of the ethylene homo- or copolymers according to the invention the catalyst system used comprises in addition to the catalyst components in form of solid particles as described above an organometallic cocatalyst.

Accordingly it is preferred to select the cocatalyst from the group consisting of trialkylaluminium, like triethylaluminium (TEA), triisobutylaluminium, tri-n-butylaluminium; dialkyl aluminium chloride, like dimethyl- or diethyl aluminium chloride; and alkyl aluminium sesquichloride. More preferably the cocatalyst is triethylaluminium or diethylaluminium chloride, most preferably triethylaluminium is used as cocatalyst.

The procatalyst of the present invention may be used in a process for producing ethylene homo- or copolymer. In particular, the process for producing ethylene homo- or copolymer comprises the steps of
  (a) introducing the procatalyst as defined above into a polymerization reactor,
  (b) introducing a cocatalyst capable of activating the said procatalyst into the polymerization reactor,
  (c) introducing ethylene, optionally $C_3$-$C_{20}$ α-olefins and optionally hydrogen into the polymerization reactor
  (d) maintaining said polymerization reactor in such conditions as to produce an ethylene homo- or copolymer.

The Ziegler-Natta catalyst system according to the present invention is thus especially suitable for a process for the production of ethylene homopolymers or copolymers in which ethylene and $C_3$-$C_{20}$-alpha olefin monomers are copolymerized in the presence of the catalyst system of the invention.

The ethylene copolymers are produced by copolymerizing ethylene monomers with one or more alpha-olefin comonomers units.

The alpha-olefin comonomer units of polyethylene resins preferably are selected from $C_3$-$C_{20}$-alpha-olefins, more preferably are selected from $C_4$-$C_{10}$-alpha-olefins, such as 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof.

Most preferably, the comonomer is 1-butene and/or 1-hexene.

If copolymers are the desired end product, the comonomer content of the ethylene copolymers can vary in wide ranges depending on the desired polymer properties.

Thus, the comonomer content can vary from 0.1 wt % up to 20 wt %, preferably 0.5 to 15 wt % and more preferably from 1.0 to 10 wt %

In addition, polymer with wide range of MFR can be produced, e.g. from $MFR_2$ from 1 to 300 g/10 min, preferably from 2 to 200 g/10 min and more preferably from 5 to 100 g/10 min, to $MFR_5$ from 0.1 to 25 g/10 min, preferably from 0.5 to 20 g/10 min and more preferably from 1 to 15 g/10 min. (190° C., 2.16 and 5 kg load, respectively).

Generally it is preferred that the produced polymers have lower MFR-values, since the lower the MFR-values, the higher the molecular weight.

As can be seen from the examples, ethylene homo- as well as copolymers produced with the catalyst system containing the inventive procatalyst have clearly lower MFR-values and thus clearly higher molecular weight than ethylene homo- or copolymers produced with a catalyst system containing a comparable procatalyst known from the state of the art, having a different internal donor, e.g. a phthalate as internal donor.

The catalyst system of the invention can be used for producing ethylene polymers, having a density of from about 900 to 965 kg/m3, preferably from 910 to 950 kg/m3.

Polymerisation processes, where the catalyst components of the invention are useful comprise at least one polymerization stage, where polymerization is typically carried out in solution, slurry or gas phase. Typically the polymerization process comprises additional polymerization stages or reactors. In one particular embodiment the process contains at least one slurry reactor zone and at least one gas phase reactor zone, each zone comprising at least one reactor and all reactors being arranged in cascade. In one particularly preferred embodiment the polymerization process for polymerizing ethylene optionally with comonomers, like propylene or other alpha-olefins, comprises at least one slurry reactor and at least one gas phase reactor arranged in that order.

The polymerization in gas phase may be conducted in a fluidized bed reactor, in a fast fluidized bed reactor or in a settled bed reactor or in any combination of these. When a combination of reactors is used then the polymer is transferred from one polymerization reactor to another. Furthermore, a part or whole of the polymer from a polymerization stage may be returned into a prior polymerization stage. Typically the gas phase polymerization reactor is operated at a temperature within the range of from 50 to 100° C., preferably from 65 to 90° C. The pressure is suitably from 10 to 40 bar, preferably from 15 to 30 bar.

The polymerization may be conducted also in slurry reactor. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The process may further comprise pre- and post reactors.

Pre-reactors comprise typically prepolymerization reactors. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step may be conducted in slurry or in gas phase. Preferably prepolymerization is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 70° C. and more preferably from 30 to 60° C.

The polymerization may be carried out continuously or batch wise, preferably the polymerization is carried out continuously.

The polyethylene copolymer can further show unimodal, bimodal or multimodal molecular weight distribution.

Unimodal polymers can be produced in a one stage polymerization, although more than one stage is possible, but then polymers with approximately the same molecular weight are produced in each stage. Any type of polymerizations as listed above is possible.

Bimodal or multimodal polyethylene copolymers can be produced in dual or multi-stage and -reactor processes which are known in the art.

Different combinations for producing multimodal polymers can be used, e.g. gas-gas phase, slurry-slurry phase, slurry-gas phase processes; slurry-gas phase polymerization being a preferred one.

Multimodal polymers with respect to the molecular weight distribution (MWD) are produced in a multistage process, where lower molecular weight and higher molecular weight polymers (components) are produced in different polymerization steps, in any order.

If the lower molecular weight component is produced in the first stage and the higher molecular weight component thus being produced in the second step, this is called normal mode.

On the contrary, if the lower molecular weight component is produced in the second stage and the higher molecular weight component thus being produced in the first step, this is called reverse mode.

Preferably the process according to the invention is run in the normal mode.

More preferably the production of the lower molecular weight and higher molecular weight components is carried out as a combination of slurry polymerization for the lower molecular weight component and gas phase polymerization for the higher molecular component.

Thus the first stage is carried out in the slurry phase and produces preferably the lower molecular weight component. The second stage can be carried out in a gas phase or in a slurry phase, but is preferably carried out in the gas phase. Preferably the second stage produces the higher molecular weight component. In a preferred polymerization process one slurry phase stage is followed by one gas phase stage.

A preferred multistage process for producing ethylene (co)polymers is a "loop-gas phase"-process, such as developed by *Borealis* (known as BORSTAR technology) described e.g. in patent literature, such as in WO-A-92/12182 and WO-A-96/18662.

It is often preferred to remove the reactants of the preceding polymerization stage from the polymer before introducing it into the subsequent polymerization stage. This is preferably done when transferring the polymer from one polymerization stage to another. Suitable methods are disclosed, among others, in EP-A-1415999 and WO-A-00/26258.

Experimental Part

1. Methods

Melt Flow Rate $MFR_2$: 190° C., 2.16 kg load $MFR_5$: 190° C., 5 kg load

The melt flow rate is measured in accordance with ISO 1133 and is indicated in g/10 min. The MFR is an indication of the flowability, and hence the processability, of the polymer. The higher the melt flow rate, the lower the viscosity of the polymer.

Particle Size Distribution PSD:

Coulter Counter LS 200 at room temperature with heptane as medium

Mean particle size is given in µm and measured with Coulter Counter LS200 at room temperature with n-heptane as medium;

Median particle size (d50) is given in µm and measured with Coulter Counter LS200 at room temperature with n-heptane as medium.

Particle size (d10) is given in µm and measured with Coulter Counter LS200 at room temperature with n-heptane as medium.

Particle size (d90) is given in μm and measured with Coulter Counter LS200 at room temperature with n-heptane as medium.

SPAN is defined as follows:

$$\frac{d90\ [\mu m] - d10\ [\mu m]}{d50\ [\mu m]}$$

ICP Analysis (Al, Mg, Ti)

The elemental analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was further diluted with DI water up to the final volume, V, and left to stabilize for two hours.

The analysis was run at room temperature using a Thermo Elemental iCAP 6300 Inductively Coupled Plasma—Optical Emission Spectrometer (ICP-OES) which was calibrated using a blank (a solution of 5% $HNO_3$), and standards of 0.5 ppm, 1 ppm, 10 ppm, 50 ppm, 100 ppm and 300 ppm of Al, Mg and Ti in solutions of 5% $HNO_3$.

Immediately before analysis the calibration is 'resloped' using the blank and 100 ppm standard, a quality control sample (20 ppm Al, Mg and Ti in a solution of 5% $HNO_3$, 3% HF in DI water) is run to confirm the reslope. The QC sample is also run after every $5^{th}$ sample and at the end of a scheduled analysis set.

The content of Mg was monitored using the 285.213 nm line and the content for Ti using 336.121 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Comonomer Content from PE (FTIR)

Comonomer content was determined in a known manner based on Fourier transform infrared spectroscopy (FTIR) determination using Nicolet Magna 550 IR spectrometer together with Nicolet Omnic FTIR software.

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 $cm^{-1}$. The comonomer used in the calibration samples was the same as the comonomer present in the samples. The analysis was performed by using the resolution of 2 $cm^{-1}$, wave number span of from 4000 to 400 $cm^{-1}$ and the number of sweeps of 128. At least two spectra were run from each film.

The comonomer content was determined from the spectrum from the wave number range of from 1430 to 1100 $cm^{-1}$. The absorbance is measured as the height of the peak by selecting the so-called short or long base line or both. The short base line is drawn in about 1410-1320 $cm^{-1}$ through the minimum points and the long base line about between 1410 and 1220 $cm^{-1}$. Calibrations need to be done specifically for each base line type. Also, the comonomer content of the unknown sample needs to be within the range of the comonomer contents of the calibration samples.

From the calibration samples a straight line is obtained as follows:

$$C_i = k \cdot \frac{A_{1378,i}}{s_i} + b$$

where $C_i$ is the comonomer content of the calibration sample i $A_{1378,i}$ is the absorbance at appr. 1378 $cm^{-1}$ of sample i $s_i$ is the thickness of the film made of calibration sample i k is the slope of the calibration line (obtained by regression analysis), and b is the intercept of the calibration line (obtained by regression analysis).

By using the thus obtained parameters k and b the comonomer content of the samples were obtained from $$C_x = k \cdot \frac{A_{1378,x}}{s_x} + b$$

where $C_x$ is the comonomer content of the unknown sample $A_{1378,x}$ is the absorbance at appr. 1378 $cm^{-1}$ of the unknown sample $s_x$ is the thickness of the film made of the unknown sample k is the slope of the calibration line obtained from the calibration samples as above b is the intercept of the calibration line obtained from the calibration samples.

The method gives the comonomer content in weight-% or in mol-%, depending on which was used in the calibration. If properly calibrated, the same approach may also be used to determine the number of methyl groups, i.e., $CH_3$ per 1000 carbon atoms.

Donor Analysis Via GC

The donor analysis of a catalyst was performed by taking a solid sample of mass, M, approximately 2 ml of solvent, dichloromethane, was added. Following this approximately 1 ml of deionised water was added to the vial. Finally, a known mass, N, of an internal standard, nonane, was added. The mixture was then sonicated for 15 min, to ensure full dissolution. After sonication the sample is left to settle into two phases and an aliquot of the organic phase is removed, this is then filtered through a 0.45 μm nylon filter into a vial suitable for the gas chromatography instrument.

The analysis is performed on a Perkin Elmer Auto System XL Gas Chromatograph containing a split loop injector and flame ionization detector. The column is a DB-1, 30 m long with an inner diameter of 0.32 mm and a phase thickness of 0.25 μm. The system stays at 40° C. for 5 minutes before ramping at 10° C./min up to 250° C., the system is kept at temperature for a further 4 minutes. If required the peak temperature could be raised to 300° C.

The results are calculated in the following manner:

$$\text{Component (wt\%)} = \frac{Ax * F * N}{Ay * Fistd * M} * 100$$

where:
Ax=component area
F=component factor
N=mass of internal standard (nonane), mg
Ay=area of internal standard (nonane)
Fistd=factor of internal standard (nonane)
M=mass of the sample, mg

EXAMPLES

Preparation of Mg-Alkoxide Compound

A mixture of 50.0 mL 2-ethylhexanol (from Sigma-Aldrich) and 25.0 mL butoxypropanol (from Sigma-Aldrich) was placed in a 300 mL glass reactor equipped with a mechanical stirrer. To this alcohol mixture 220.0 mL of BOMAG ($Mg(Bu)1,5(Oct)_{0.5}$ (a 20% solution in toluene), from Chemtura, was added within 80 minutes with stirring (molar ratio 2-ethylhexanol/butoxypropanol=1.9, and molar ratio alcohol/Mg=2.1). During the addition reactor contents were maintained below 25° C. After the addition of BOMAG, mixing of the reaction mixture at 25° C. was continued for another 60 minutes. The temperature of the reaction mixture was then raised to 60° C. within 14 minutes and held at that temperature for 60 minutes with stirring, at which time the reaction was complete. The reaction mixture was cooled to room temperature to obtain 240 g of the Mg-alkoxide compound as a colourless liquid.

Example 1

Preparation of Solid Catalyst Component
(Precipitated Route)

19.5 mL of $TiCl_4$ was placed in a 300 mL glass reactor equipped with a mechanical stirrer at 25° C. Mixing speed was set to 170 rpm. and temperature was raised to 90° C. 20 mL of solution of magnesium alkoxide compound prepared as described above, and 1 mL of donor (2,2-di(2-tetrahydrofuryl)propane), CAS no 89686-69-1, provided by TCI were pre-mixed for five minutes at room temperature, and this mixture was slowly added to $TiCl_4$ keeping the reaction temperature at 90° C. 2 mL of Viscoplex 1-254, provided by EvonikRohMax Additives, GmbH, (a 50% solution in toluene), and 5 mL of heptane was added and the reaction mixture was stirred at 90° C. for 30 minutes. Stirring was stopped, the reaction mixture was allowed to settle at 90° C., the liquid was siphonated and the resulting solid catalyst was washed as follows:
Wash 1
100 mL of hot toluene was added, stirred at 90° C. for 30 minutes, the reaction mixture was allowed to settle and the upper liquid layer was siphonated.
Wash 2
100 mL of hot heptane was added, stirred at 90° C. for 20 minutes, the reaction mixture was allowed to settle and the upper liquid layer was siphonated.
Wash 3
100 mL of hot heptane was added, stirred at 90° C. for 20 minutes, the temperature was reduced to room temperature while stirring, reaction mixture was allowed to settle and the upper liquid layer was siphonated.
Wash 4
100 mL of pentane was added at room temperature, stirred for 10 minutes, the reaction mixture was allowed to settle and the upper liquid layer was siphonated.

Finally the temperature was increased to 60° C. and the solid catalyst was dried at this temperature for 20 minutes under a flow of nitrogen to yield 3 g of the catalyst as an air sensitive solid.

Example 2

Preparation of Solid Catalyst Component (Emulsion Route)

19.5 mL of $TiCl_4$ was placed in a 300 mL glass reactor equipped with a mechanical stirrer at 25° C. Mixing speed was set to 250 rpm. 30 mL of solution of magnesium alkoxide compound prepared as described above, and 1 mL of donor (2,2-di(2-tetrahydrofuryl)propane) were pre-mixed for five minutes at room temperature, and this mixture was slowly added to $TiCl_4$ keeping the reaction temperature below 25° C. After five minutes of mixing, 5 mL of Viscoplex 1-254 (a 50% solution in toluene), 1 ml of Necadd 447 (2 mg in 1 mL of toluene, used turbulence minimizing agent), and 9 ml of heptane was added. After stirring at room temperature for 5 minutes the temperature of the reaction mixture was raised to 90° C. within 17 minutes and the temperature was maintained at 90° C. for another 30 minutes. Stirring was stopped, the reaction mixture was allowed to settle at 90° C., the liquid was siphonated and the resulting solid catalyst was washed as follows,
Wash 1
100 mL of hot toluene was added, stirred at 90° C. for 30 minutes, the reaction mixture was allowed to settle and the upper liquid layer was siphonated.
Wash 2
100 mL of hot heptane was added, stirred at 90° C. for 20 minutes, the temperature was reduced to room temperature while stirring, reaction mixture was allowed to settle and the upper liquid layer was siphonated.
Wash 3
100 mL of pentane was added at room temperature, stirred for 10 minutes, the reaction mixture was allowed to settle and the upper liquid layer was siphonated.

Finally the temperature was increased to 60° C. and the solid catalyst was dried at this temperature for 20 minutes under a flow of nitrogen to yield 3.3 g of the catalyst as an air sensitive solid.

Example 3

Preparation of Solid Catalyst Component with Reduction of $Ti^{+4}$ (Emulsion Route)

25 mL of $TiCl_4$ was placed in a 300 mL glass reactor equipped with a mechanical stirrer at 25° C. Mixing speed was set to 250 rpm. 38 mL of solution of magnesium alkoxide compound prepared as described above, and 1.3 mL of donor (2,2-di(2-tetrahydrofuryl)propane) were pre-mixed for five minutes at room temperature, and this mixture was slowly added to $TiCl_4$ keeping the reaction temperature below 25° C. After five minutes of mixing, 6 mL of Viscoplex 1-254 (a 50% solution in toluene), 1 mL of Necadd 447 (2 mg in 1 mL of toluene) and 9 mL of heptane was added. After stirring at room temperature for 5 minutes the temperature of the reaction mixture was raised to 90° C. within 18 minutes and the temperature was maintained at 90° C. for another 30 minutes. Stirring was stopped, the reaction mixture was allowed to settle at 90° C., the liquid was siphonated and the resulting solid catalyst was washed as follows:

Wash 1

100 mL of hot toluene with 0.15 mL DEAC was added, stirred at 90° C. for 30 minutes, the reaction mixture was allowed to settle and the upper liquid layer was siphonated.

Wash 2

100 mL of hot heptane was added, stirred at 90° C. for 20 minutes, the temperature was reduced to room temperature while stirring, reaction mixture was allowed to settle and the upper liquid layer was siphonated.

Wash 3

100 mL of pentane was added at room temperature, stirred for 10 minutes, the reaction mixture was allowed to settle and the upper liquid layer was siphonated.

Finally the temperature was increased to 60° C. and the solid catalyst was dried at this temperature for 20 minutes under a flow of nitrogen to yield 4.8 g of the catalyst as an air sensitive solid.

Comparative Example 1

CE1

The solid catalyst component was prepared otherwise according to Example 8 of WO 2004/029112, except that diethylaluminium chloride was used as an aluminium compound instead of triethylaluminium.

TABLE 1

Donor in Examples 1 to 3 was 2,2-di(2-tetrahydrofuryl)propane (Donor A) Donor in CE1 was phthaloyl dichloride (PDC)

| Donor | Example | Ti [wt %] | Mg [wt %] | Al [wt %] | Donor [wt %][1] | Mean ps [μm] | $Ti^{4+}$ (% of Ti) |
|---|---|---|---|---|---|---|---|
| A | 1 | 5.16 | 12.10 | nm | 8.3 | 15 | Not reduced |
| A | 2 | 5.10 | 14.20 | nm | nm | 33 | Not reduced |
| A | 3 | 5.02 | 13.50 | 0.17 | nm | 35 | 76 |
| PDC | CE1 | 3.70 | 12.70 | 0.21 | 32 | 46 | 71 | nm . . . not measured
[1]donor amount measured using GC
ps . . . particle size

Example 4

Homopolymerization

All polymerizations were conducted in a 3 L stainless steel semi-batch reactor. 1.25 L of propane and alkyl aluminum co-catalyst (TEA) were used in all polymerization experiments. The polymerization procedure was conducted as follows: 1.25 L of propane and the desired amount of hydrogen were added and the contents of the reactor were stirred and heated to the run temperature (85° C.). The co-catalyst and the catalyst were then introduced along with ethylene. Ethylene was fed on demand to maintain the specified pressure for the specific length of the polymerization run. The reactor was maintained and controlled at the desired run temperature throughout the polymerization. Upon completion, the ethylene flow was stopped and the reactor pressure slowly vented off. The reactor was opened and the polymer product was collected and dried in a fume hood overnight.

TABLE 2

Homopolymerisation results

| | Polymerisation | | | | | | | | | | |
|---|---|---|---|---|---|---|---|---|---|---|---|
| | P1 | P2 | P3 | P4 | P5 | P6 | P7 | P8 | P9 | P10 | P11 |
| Catalyst | Ex1 | Ex1 | Ex1 | Ex2 | Ex2 | Ex3 | Ex3 | Ex3 | CE1 | CE1 | CE1 |
| Catalyst amount [mg] | 49 | 20 | 29 | 99 | 99 | 60 | 76 | 103 | 104 | 107 | 105 |
| $H_2/C_2$ [mol/kmol] | 100 | 620 | 800 | 100 | 620 | 100 | 380 | 500 | 100 | 380 | 620 |
| Yield [g] | 300 | 121 | 106 | 109 | 187 | 106 | 157 | 210 | 214 | 150 | 243 |
| Activity [kgPE/gCat.h] | 6 | 6 | 4 | 1.1 | 2 | 2 | 2.1 | 2 | 2 | 1.5 | 2 |
| $MFR_2$ [g/10 min] | 0.8 | 58 | 150 | 0.6 | 55 | 0.8 | 20 | 84 | 2.3 | 93 | 400 |

TEA was used as the co catalyst with Al/Ti (mol/mol)=30, with 6 mol % ethylene concentration in the reactor.

From the results it can be seen that with using the inventive catalyst components of Ex1 to Ex3 the Mw capacity markedly increased compared to using the catalyst component of CE1. Further, it can be seen that the catalyst component of Ex1 leads to an increase in activity compared to using the catalyst component of CE1.

Example 5

Copolymerization with 1-butene

All polymerizations were conducted in a 3 L stainless steel semi-batch reactor. 1.25 L of propane and alkyl aluminum co-catalyst (TEA) were used in all polymerization experiments. The polymerization procedure was conducted as follows: 1.25 L of propane and the desired amount of hydrogen was added and the contents of the reactor were stirred and heated to the run temperature (85° C.). The co-catalyst and the catalyst were then introduced along with the desired amount of 1-butene co-monomer and ethylene. Ethylene was fed on demand to maintain the specified pressure for the specific length of the polymerization run. The reactor was maintained and controlled at the desired run temperature throughout the polymerization. Upon completion, the ethylene flow was stopped and the reactor pressure slowly vented off. The reactor was opened and the polymer product was collected and dried in a fume hood overnight.

TABLE 3

Copolymerisation results

| Catalyst | Ex1 | Ex2 | Ex3 | CE1 |
|---|---|---|---|---|
| Catalyst amount [mg] | 30.2 | 29.6 | 57.9 | 34.6 |
| $H_2/C_2$ [mol/kmol] | 100 | 100 | 100 | 100 |
| $C_4/C_2$ [mol/kmol] | 610 | 610 | 600 | 610 |
| Yield [g] | 309 | 90 | 227 | 139 |
| Activity [kgPE/gCat · h] | 10 | 3 | 4 | 4 |
| 1-butene [wt %] | 5 | 4.5 | 6.2 | 8.1 |
| $MFR_5$ [g/10 min] | 4 | 4 | 7 | 30 |

TEA was used as the co catalyst with Al/Ti (mol/mol)=30, with 8 mol % ethylene concentration in the reactor.

It can be seen that with all inventive catalysts the molecular weight is clearly higher (MFR lower) compared to the comparative catalyst. Further, activity is at least on the same level or higher with the catalysts of the invention.

The invention claimed is:

1. A process for producing an ethylene homo- or copolymer by polymerizing ethylene and optionally a $C_3$-$C_{20}$ alpha-olefin comonomer in the presence of a Ziegler-Natta (ZN) type ethylene polymerization catalyst component in the form of solid particles and a co-catalyst, said catalyst component obtained by the steps of:
   a) $a_1$) providing a solution of an alkoxy compound (Ax) that is the reaction product of a Group 2 metal compound and an alcohol mixture of a monohydric alcohol (A) and an alcohol (B) comprising in addition to the hydroxyl moiety at least one further oxygen bearing group that is different from a hydroxyl moiety, optionally in an organic liquid reaction medium; or
   $a_2$) providing a solution of an alkoxy compound mixture of at least a first alkoxy compound (Ax) that is the reaction product of a Group 2 metal compound and a monohydric alcohol (A), optionally in an organic liquid reaction medium, and at least a second alkoxy compound (Bx) that is the reaction product of a Group 2 metal compound and an alcohol (B) comprising in addition to the hydroxyl moiety at least one further oxygen bearing group that is different from a hydroxyl moiety, optionally in an organic liquid reaction medium; and
   b) adding said solution to at least one compound of a transition metal (CT),
   c) preparing the catalyst component in the form of solid particles,
   d) optionally performing one or more washing steps and
   e) recovering the catalyst component in the form of solid particles,
   wherein a compound of the formula (I) or an isomer mixture therefrom is added as internal donor at any step prior to step e)

wherein in the formula (I)

X is C or Si, $R_1$ can be the same or different and can be hydrogen, a linear or branched $C_1$ to $C_8$-alkyl group, or a $C_3$-$C_8$-alkylene group, and $R_2$ to $R_5$ are the same or different and can be hydrogen, a linear or branched $C_1$ to $C_8$-alkyl group, or a $C_3$-$C_8$-alkylene group, whereby two or more of $R_1$ to $R_5$ can form a ring, n is the same for both oxygen-containing rings and can be 0, 1 or 2, whereby the two oxygen-containing rings can be individually saturated or unsaturated;

wherein no external carrier material is used to form the catalyst component into solid particles; and wherein the solid particles of the catalyst component have an average particle size range of 5 to 200 μm.

2. The process according to claim 1, wherein in formula (I) X is C, both $R_1$'s are the same and are a linear $C_1$ to $C_4$ alkyls, $R_2$ to $R_5$ are the same or different and can be H or a $C_1$ to $C_2$ alkyl, n for both oxygen-containing rings is 1, and both oxygen-containing rings are saturated.

3. The process according to claim 1, wherein in formula (I) X is C, both $R_1$ are the same and are methyl, up to four of the residues $R_2$ and $R_5$ are methyl and the remaining residues are H, n for both oxygen-containing rings is 1, and both oxygen-containing rings are saturated.

4. The process according to claim 1, wherein the monohydric alcohol (A) is of formula ROH in which R is a linear or branched $C_1$-$C_{20}$ alkyl.

5. The process according to claim 1, wherein the alcohol (B) is a $C_2$ to $C_4$-glycol monoether, wherein the ether moiety comprises from 2 to 18 carbon atoms.

6. The process according to claim 1, wherein said Group 2 metal is magnesium.

7. The process according to claim 1, wherein said at least one compound of a transition metal is selected from Group 4 and/or Group 5 metal compounds.

8. The process according to claim 1, wherein the internal donor of formula (I) or an isomer mixture thereof is added to solution $a_1$) or $a_2$) prepared in step a).

9. The process according to claim 1, wherein preparation of the catalyst component in the form of solid particles comprises the steps of:
   (1) providing a solution (S1) of
   (1-1) an alkoxy compound (Ax) that is the reaction product of a Group 2 metal compound and an alcohol mixture of a monohydric alcohol (A) and an alcohol (B) comprising in addition to the hydroxyl moiety at least one further oxygen bearing group that is different from a hydroxyl moiety, or
   (1-3) an alkoxy compound mixture of at least a first alkoxy compound (Ax) that is the reaction product of a Group 2 metal compound and a monohydric alcohol (A) and at least a second alkoxy compound (Bx) that is the reaction product of a Group 2 metal compound and an alcohol (B) comprising in addition to the hydroxyl moiety at least one further oxygen bearing group that is different from a hydroxyl moiety, optionally in an organic liquid reaction medium,
   (2) combining said solution (S1) with at least one transition metal compound (CT),
   (3) precipitating said catalyst component in the form of a solid particle,
   (4) optionally performing one or more washing steps, and (5) recovering the solidified particles of the catalyst component, wherein an electron donor of formula (I) or an isomer mixture thereof is added at any step prior to step (5).

10. The process according to claim 9, wherein the internal donor of formula (I) or an isomer mixture thereof is added to solution (1-1) or (1-2) prepared in step (1).

11. The process according to claim 9, wherein the addition of solution (S1) to the at least one transition metal compound (CT) in step (2) is done at a temperature range of 50 to 110° C., at which temperature the at least one transition metal compound (CT) is in a liquid form, resulting in the precipitation of said solid catalyst components, whereby a surfactant can be added in step (1) to solutions (1, 1) or (1-2) in step (2).

12. The process according to claim 9, wherein the solution (S1) is mixed with at least one transition metal compound (CT) in liquid form at a temperature of about −20° C. to about 30° C. and precipitating the solid catalyst components by subsequently slowly raising the temperature to a temperature range of 50 to 110 ° C., whereby the rate of temperature increase is in the range from 0.1° C. to 30° C. per minute and whereby a surfactant is added to the solution (S1) before step (2).

13. The process according to claim 1, wherein the preparation of the catalyst component in form of solid particles comprises the steps of:
   (1) providing a solution (S1) of
      (1-1) an alkoxy compound (Ax) that is the reaction product of a Group 2 metal compound and an alcohol mixture of a monohydric alcohol (A) and an alcohol (B) comprising in addition to the hydroxyl moiety at least one further oxygen bearing group being different from a hydroxyl moiety, or
      (1-2) an alkoxy compound mixture of at least a first alkoxy compound (Ax) that is the reaction product of a Group 2 metal compound and a monohydric alcohol (A), and at least a second alkoxy compound (Bx) that is the reaction product of a Group 2 metal compound and an alcohol (B) comprising in addition to the hydroxyl moiety at least one further oxygen bearing group being different from a hydroxyl moiety,
   (2) adding said solution (S1) to at least one compound of a transition metal (CT) to produce an emulsion, wherein the dispersed phase of the emulsion is in the form of droplets and contains more than 50 mol% of the Group 2 metal in said alkoxy compound(s),
   (3) agitating the emulsion in order to maintain the droplets of said dispersed phase within a predetermined average size range of 5 to 200 μm,
   (4) solidifying said droplets of the dispersed phase,
   (5) optionally performing one or more washing steps, and
   (6) recovering the solidified particles of the catalyst component,
   whereby an electron donor of formula (I) or an isomer mixture thereof is added at any step prior to step (6).

14. The process according to claim 13, wherein the internal donor of formula (I) or an isomer mixture thereof is added to solution (1-1) or (1-2) prepared in step (1).

15. The process according to claim 1, wherein the ethylene homo- or copolymer has:
   (i) an MFR2 from 1 to 300 g/10 min, and/or
   (ii) an MFR5 from 0.1 to 25 g/10 min.

* * * * *